United States Patent [19]

Hawker

[11] Patent Number: 4,875,742
[45] Date of Patent: Oct. 24, 1989

[54] SOLENOID OPERATED HYDRAULIC CONTROL VALVE

[75] Inventor: Michael J. Hawker, Lincoln, England

[73] Assignee: Clayton Dewandre Co. Ltd., Lincoln, England

[21] Appl. No.: 184,738

[22] Filed: Apr. 22, 1988

[30] Foreign Application Priority Data

Apr. 23, 1987 [GB] United Kingdom ............... 8709615

[51] Int. Cl.$^4$ .................... B60T 15/02; F16K 31/02
[52] U.S. Cl. ........................... 303/119; 251/129.16; 251/129.21
[58] Field of Search .................. 303/61, 119; 137/596.17; 251/129.02, 129.16, 129.21

[56] References Cited

U.S. PATENT DOCUMENTS

| | | | |
|---|---|---|---|
| 1,664,613 | 4/1928 | French | 251/129.21 |
| 2,374,895 | 5/1945 | Ray | 251/129.16 |
| 3,433,256 | 3/1969 | Stillhard et al. | 251/129.21 |
| 3,617,098 | 11/1971 | Leiber | 303/119 |
| 4,005,733 | 2/1977 | Riddel | 251/129.16 |
| 4,138,165 | 2/1979 | Blomberg et al. | 303/61 X |
| 4,385,339 | 3/1983 | Takada et al. | 251/129.21 X |
| 4,486,053 | 12/1984 | Hawker et al. | 303/119 |
| 4,572,436 | 2/1986 | Stettner et al. | 251/129.16 X |
| 4,679,589 | 7/1987 | Inden et al. | 303/119 X |
| 4,718,635 | 1/1988 | de Concini et al. | 251/129.21 |

FOREIGN PATENT DOCUMENTS

2117090 10/1983 United Kingdom ........... 251/129.21

Primary Examiner—Andres Kashnikow
Assistant Examiner—Timothy Newholm
Attorney, Agent, or Firm—J. O. Ray, Jr.

[57] ABSTRACT

A solenoid operated control valve for use as an inlet and/or exhaust valve in a pressure modulator has a flat valve element cooperating with a flat valve seat to control the flow of fluid through the valve. At least a portion of the solenoid armature has opposed parallel flat surfaces and is disposed within a gap defined between parallel faces for movement axially within the gap to operate the valve. The flat valve seat is disposed in the plane of one of the parallel faces and one of the parallel faces is a face of the stator. All required settings, more particularly, magnetic reach, the energized gap and excess valve travel to compensate for wear are set automatically by spacers. The spacers give the required settings directly from their own thickness and not through other component dimensions in combination. This has very important implications for production since the direct spacer automatically gives the required dimension, whereas indirect ones can only be chosen by assembly measurement or selective assembly, both of which are expensive.

14 Claims, 9 Drawing Sheets

FIG. 10

SOLENOID OPERATED HYDRAULIC CONTROL VALVE

BACKGROUND OF THE INVENTION

This invention relates, in general, to a solenoid operated hydraulic control valve and, more particularly, this invention relates to such a valve for use as an automotive brake pressure modulation valve to substantially maintain optimum adhesion or traction between the tire of the vehicle and the road surface during braking when the wheel shows a tendency to lock.

FIELD OF THE INVENTION

Braking systems incorporating such control are commonly referred to as 'anti-lock systems.' Anti-lock solenoid valves are known, as for example, in European Patent 0 051 965 in which the moving armature is pressure balanced to avoid a large magnetic operating force which requires a large operating current of typically many amps. Also, such valves, unlike other valves, require especially tight tolerances for the armature travel or magnetic reach and for circularity and alignment of moving parts. Assembly, setting-up and adjustment of this valve is problematic, especially in mass production. The necessary procedures in such mass production being complex and costly, especially for high speed valves where the armature travel is small so that even errors measured in ten thousandths of an inch are significant.

There is a current trend to supply anti-lock systems on light mass-produced vehicles, particularly mass produced vehicles which are lighter than 2 tons GVW. In this market the size and cost of vehicle parts is of paramount importance. With solenoid valves for light vehicles an unbalanced armature is possible since, with a small fluid flow, small fluid passages are sufficient and the unbalanced pressure areas can be tolerated with respect to forces and operating current.

OBJECTS OF THE INVENTION

One object of this invention is to provide a solenoid operated hydraulic control valve which is simpler and cheaper to manufacture than conventional valves of that type and, more especially, a solenoid operated control valve suitable for use in vehicle anti-lock systems.

SUMMARY OF THE INVENTION

In accordance with the present invention, it is proposed to provide a solenoid operated hydraulic control valve comprising a flat valve element cooperating with a flat valve seat to control the flow of fluid through the valve in which at least a portion of the solenoid armature has opposed parallel surfaces and is disposed within a gap defined between parallel faces for movement axially within the gap to operate the valve, wherein the flat valve seat is disposed in the plane of one of the parallel faces, and wherein one of the parallel faces is a face of the stator.

By virtue of the use of cooperating flat valve elements and an armature which, in preferred embodiments is a simple washer type armature, give rise only to flatness requirements so avoiding the need for the very accurately fitting armature of the conventional balanced design and the need for accurate concentricity control.

The armature movement necessary to give pressure change for a given input electrical signal, and indeed all required settings can be automatically achieved during assembly by the use of spacers in conjunction with flat surfaces. The spacers give the required settings directly from their own thickness and not through other component dimensions in combination. This has very important implications for production since the direct spacer automatically gives the required dimension, whereas indirect ones can only be chosen by assembly measurement or selective assembly both of which are expensive.

Preferably, the gap between the parallel faces is defined by a separator ring having the same thickness as the portion of the armature and first spacing means, the thickness of which determines the magnetic reach of the armature. Hence, the armature and the separator ring are conveniently produced (ground) together so that they have precisely the same but not necessarily an accurately defined thickness. In this manner, the magnetic reach can be accurately and directly determined by the thickness of the first spacing means.

Similar considerations apply to the setting of the so-called energized gap. Second spacing means are preferably disposed to intervene between the armature and the face of the solenoid stator so that the solenoid is the second spacing means directly determines the gap between the armature and the stator when the solenoid is energized.

In the presently preferred embodiment, the armature is assembled to a locating abutment or facepiece separated by a third spacing means whose thickness is the distance between the valve element face and one of the armature faces to produce excess travel of the valve element relative to the armature travel thus ensuring contact between the valve element and valve seat, up to a wear level equal to this excess in the no flow condition. The flat valve element may be a simple disc, or the like. The element is carried by the armature in an assembly including a spring or other biasing means urging the element against a locating abutment such that when not in contact with the valve seat the flat valve element lies substantially parallel thereto.

A valve according to the present invention may be of a normally open configuration as used for the inlet/delivery valve of an anti-lock pressure modulator or a normally closed valve as used for the exhaust valve of a pressure modulator. Indeed, both the inlet/delivery and exhaust valve of a pressure modulator may be valves in accordance with the present invention, although it is possible to have a combination of an unbalanced inlet valve in accordance with the invention and a balanced exhaust if this is required.

As stated above, there is no requirement for an accurately fitting armature and tight concentricity control. In the case of a normally closed valve, according to the invention, the valve element or disc can be initially unseated when the solenoid is energized by being raised at one edge. Such lever action reduces the total pull required to lift the valve against pressure head.

BRIEF DESCRIPTION OF THE INVENTION

The normally open inlet/delivery valve, shown diagrammatically in FIG. 1, includes a flat washer-like armature 10 which is disposed within a gap 12 defined between a flat annular face 16 of a solenoid stator 18 presenting poles 18a, 18b and a flat annular face 20 substantially parallel to the stator face 16 presented by an end piece 22 of the valve as will be described below with reference to FIG. 3. The end piece 22 is spaced from the stator 18 by an intervening ring 24, having the same thickness as the armature 10, and a spacer the thickness $t_1$ of which is selected to determine the magnetic reach of the solenoid and is typically of the order of 0.006 inches. A valve seat 26 mounted in the stator has a flat surface 28 that lies in the plane of the stator face 16.

The armature 10 forms part of an armature assembly including a floating-valve element or disc 30 for cooperation with the valve seat 26 which is received within the bore of a guide bush 32 securely held to the armature 10 and spaced from it by intervening spacers $t_2$ and $t_3$.

Figures 1, 1A:
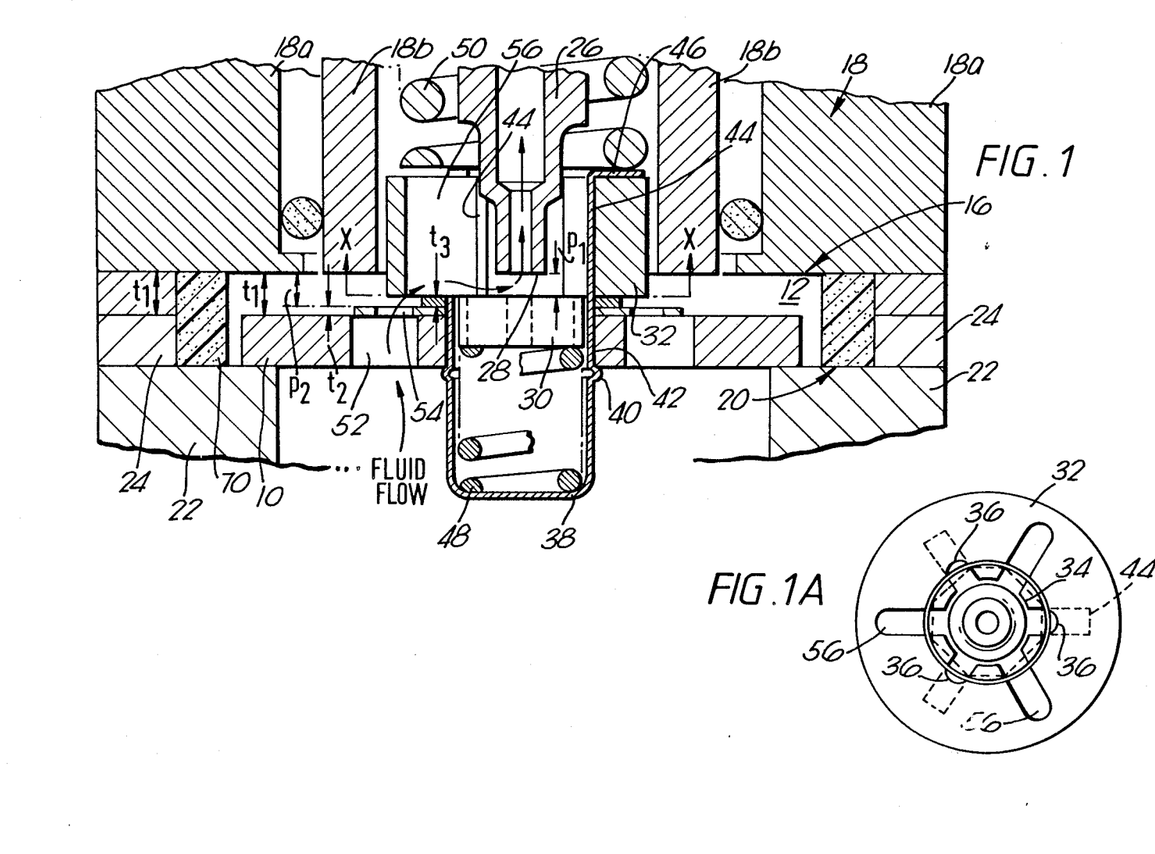
FIG. 1 is a diagrammatic cross-section of a solenoid operated hydraulic control valve having a normally open configuration and suitable for use as the delivery or inlet valve of a pressure modulation valve of an anti-lock system.
FIG. 1A is a view on X—X in FIG. 1.

As will be seen from FIG. 1A, the guide bush 32 has a bore 34 within which the valve seat 26 is received and from which emanate three equally angularly spaced radial grooves 36 extending axially of the guide bush 32. A cup 38 having a circumferential corrugation 40 is inserted into a central hole 42 in the armature 10. The cup 38 is located by abutment of the corrugation 40 with the lower side of the armature 10.

Tags 44 extending from the lip of the cup 38 pass through the radial grooves 36. The ends 46 thereof being bent over the top of the guide bush 32 to secure the assembly. The lower flat surface of the guide bush 32 provides an abutment for the floating valve element or disc 30 which is housed within the cup 38 and loaded by a spring 48.

A spring 50 disposed within the annular solenoid stator 18 around the valve seat 26 biases the armature assembly away from the annular solenoid stator face 16 toward the normally open position illustrated so that the armature 10 engages the flat face 20 of the end piece 22 and a flowpath is provided for the flow of fluid from an inlet (not shown) in the end piece through the valve seat 26. The flow path as indicated in FIG. 1 is through a ring of holes 52,54 in the armature 10 and spacer $t_2$, respectively, and equally angularly spaced radial grooves 56 in the guide bush 32, these grooves 56 being interspersed with, but deeper, than the grooves 36.

Figure 2:
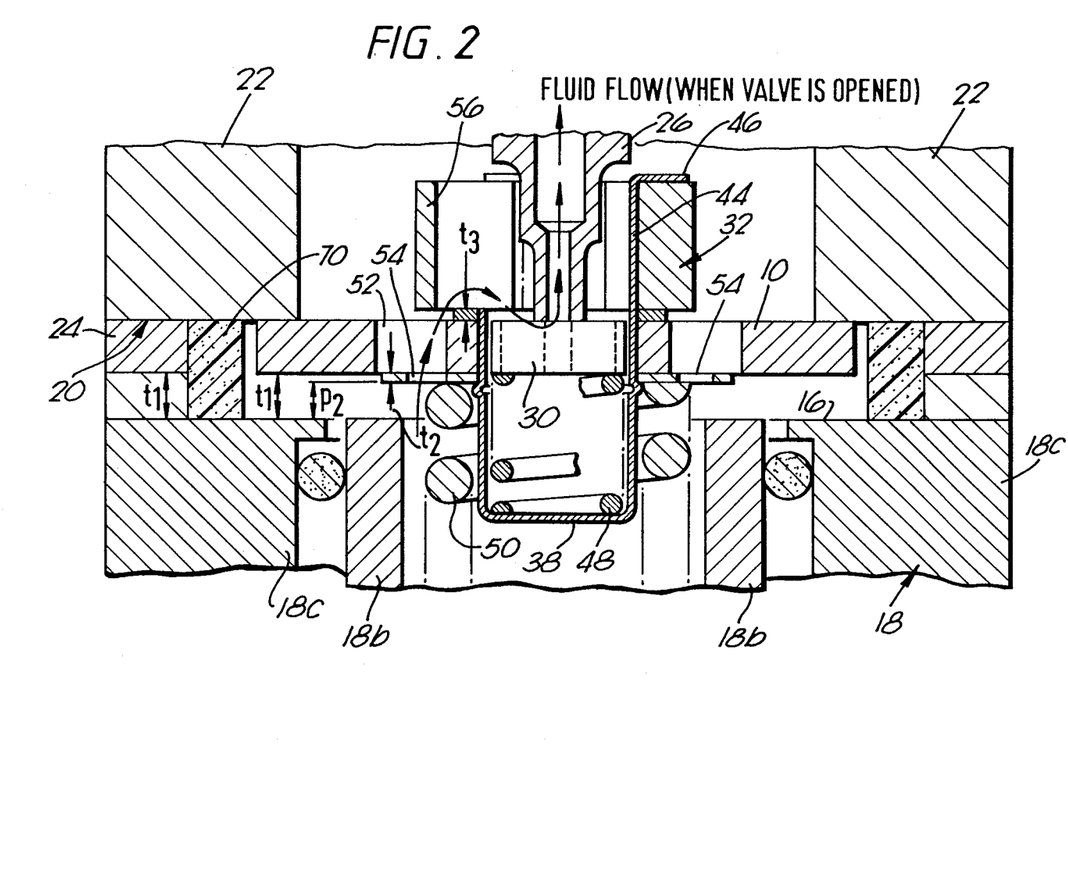
FIG. 2 is a diagrammatic cross-section similar to FIG. 1 but of a normally closed valve suitable for use as the exhaust valve of a pressure modulation valve.

The normally closed exhaust valve shown in FIG. 2 is of closely similar construction, but in this case the arrangement is inverted. A return spring 50 which surrounds the cup 38 projecting from one side of the armature 10 biases the armature assembly away from the flat annular face 16 of the solenoid stator presenting poles 18b and 18c into contact with a flat face 20 of the end piece 22. In this position the floating valve element 30 or disc engages the flat valve seat 26 which lies in the plane of the end piece face 20.

When the valve opens upon energization of the solenoid fluid flows from within the annular solenoid stator 18 through the ring of holes 52, 54 in the spacer $t_2$ and armature 10 through the radial grooves 56 and into and through the valve seat 26.

In each of the above described valves the diameter of spacer $t_2$ is dimensioned such as to prevent contact of the armature 10 with the solenoid stator 18 when the solenoid is energized. The spacer $t_2$ thus determines the so-called energized gap and is selected to give optimum magnetic decay during armature release. It is typically in the range 0.0015–0.002 meters. Spacer $t_3$ determines the valve disc overtravel available which accommodates seat/disc wear and erosion.

The amount of life $l_1$ permitted between the valve element or disc 30 and the seat 26 is determined by the construction and given by $l_1 = t_1 - t_2 - t_3$. The armature travel $l_2$ is given by $l_2 = t_1 - t_2$.

It will be seen that the dimensional setting up of the delivery valve (FIG. 1) is achieved to within a specified band by the use of the three spacers $t_1$, $t_2$ and $t_3$ each of which will incur its own thickness tolerance. The same reasoning applies to the exhaust valve (FIG. 2) but because the valve is normally closed the spacers are positioned accordingly and the armature return spring 50 is rated appropriately together with the operating coil (not shown).

Figure 3:
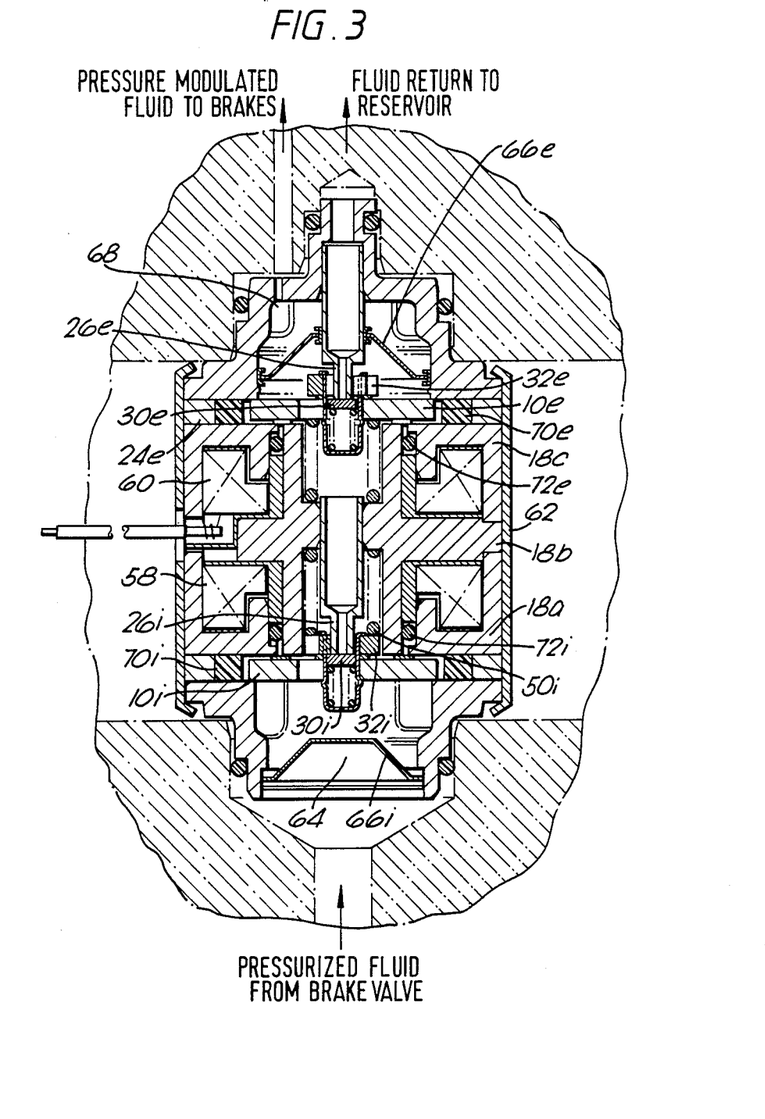
FIG. 3 is a cross-section of a pressure modulator incorporating inlet and exhaust valves as shown in Figures 1 and 2.

The valve shown in FIG. 3 is a complete pressure modulator for use in an anti-lock brake system and incorporating an inlet delivery valve as described above with reference to FIGS. 1 and 1A and an exhaust valve as described with reference to FIG. 2. The inlet and exhaust valves having respective solenoid coils 58, 60 and a common solenoid core or stator assembly 18a, 18b, 18c are housed within a container 62.

Pressurized fluid supplied from the brake valve (not shown) enters port 64 through filter screen 66i and, when there are no electrical modulator signals in coil 58 passes this inlet valve disc 30i which is normally lifted from the seat 26i by the spring 50i and then passes through port 68 to operate the brakes.

A seal 70i whose bore dimension is such as to contain the axial bursting force under high fluid pressure within exceeding the external pressure force over seal avoids unnecessary axial working force on the outside container 62. The same arrangement is used at the exhaust valve end in respect of seal 70e, but the external pressure force is only over the annulus between the delivery seal and return seal giving a resultant force loading the modulator towards its delivery/exhaust manifold. This avoids any requirements for accurate manifold spacing particularly where several modulators with height variation are together.

To ensure correct operation of the delivery and exhaust valves for the purpose of modulating pressure the following manufacturing requirements must be met together with the correct choice and fitment of spacer t₁, t₂ and t₃ (see FIGS. 1 and 2).

The armature 10 and ring 24 (both ends of modulator) must have the same thickness with both faces parallel and flat. If the two components are produced together in batches the thickness may have an open tolerance. The face of the guide bush 32 for contact with the valve element 30 (both ends of modulator) must be flat.

Both ends of the solenoid core or stator 18, must be flat (but no accuracy is required on parallelism) and additionally the flat face 28 of valve seat 26 must have the required valve seat finish which can be obtained by lapping after it has been pressed into its mounting i. e. stator portion (delivery valve) or end piece (exhaust valve) to give a slight protrusion.

This protrusion may result from elastic retrieval following the use of a flat anvil pushing the seat into its mounting, or it may be achieved by the use of jigs.

The faces of the two end pieces 22 must be flat.

There are no important concentricity requirements for the armatures 10i, 10e but they are guided by the location of guide bush 32i, 32e sliding over the valve seat 26i, 26e.

In the unenergized state i. e. no voltage applied to coil 58 the inlet valve is open. On receiving a voltage signal the coil 58 generates a magnetic pull between the stator poles 18a, 18b urging the armature 10i to the valve closed position. Complete contact between the poles 18a, 18b and armature 10i is prevented by spacer t₂ (the energized gap) which is adjusted (selected) to ensure a fast drop-out over armature return when the voltage is removed to open the valve. The small annular gap between the stator poles 28a, 18b and 18b, 18c is adjusted to achieve a fast decay of magnetic flux without impairing pull-in performance. Seals 72i, 72e are incorporated to contain the pressurized fluid and the complete valve assembly is contained by the rolled over tube 62 which deals with handling forces predominantly.

The exhaust valve is normally closed, (see also Figure 2) and when a voltage signal is applied to the coil the valve disc lifts allowing fluid from the brakes to pass through the second screen filter 66e and return to the reservoir. The valve movements are determined by the spacers t₁, t₂ and t₃ as with the inlet valve, but they are located to suit the normally closed configuration.

It is a basic requirement that braking systems release the brakes when the brake pedal effort is removed and if an anti-lock modulator is in the 'hold' state (i.e. inlet and exhaust valve closed with pressure in brakes) then the electric signal to the inlet valve prevents this happening. To avoid this situation in conventional valves a separate one-way valve is fitted. The one way feature is automatically achieved in the inlet valve of FIGS. 1 and 3 by the inlet valve disc 30 since under the lightly loaded spring 48 it cannot sustain pressure at the delivery unless there is pressure at the inlet.

The construction of the armature 10e and exhaust valve disc 30e is such that during magnetic pull the armature can tilt because of the diametrical clearance between the valve seat 26e and guide bush 32e and slight unevenness of the magnetic flux due to eccentricity between the bore and outside diameter of armature 10e with the result that the disc 30e is levered from the seat 26e whilst under fluid pressure (typically 170 bars) thereby minimizing the magnetic pull required. Since magnetic pull is time growth dependent a faster valve response results.

Figure 4:
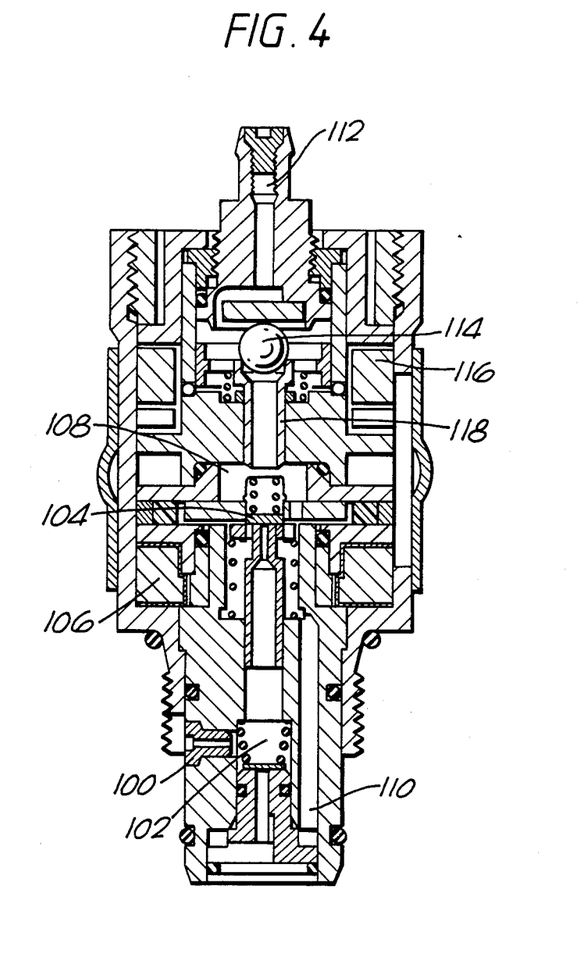
FIG. 4 is a cross-section of a pressure modulator having an inlet valve in accordance with the present invention and an exhaust valve of conventional balanced design.

The modulator of FIG. 4 includes an inlet valve, as described with reference to FIG. 1, except that it is inverted with fluid supplied from the brake valve through the valve seat so that the non-return feature is absent and a balanced exhaust valve similar to that described in our European Patent No. 0 051 965 is achieved.

Pressurized fluid from the brake valve enters at port 100 and flows through chamber 102 towards normally open valve 104. The coil 106 can modulate this valve in the same manner described for the inlet valve of FIGS. 1 and 3. The fluid passes through chamber 108 either to the brakes via port 110 or to reservoir via port 112 if the valve is modulated. The opening of normally-closed valve 114 is achieved by coil 116 lifting armature 118 the spool diameter of which is the same as the valve seat diameter preventing an axial pressure force acting thereon.

Figure 5:
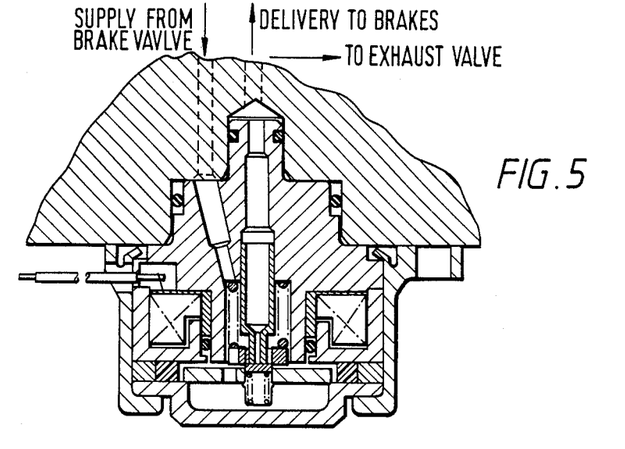
FIGS. 5 and 6 show separate inlet and exhaust valve assemblies in accordance with the invention.
Figure 6:
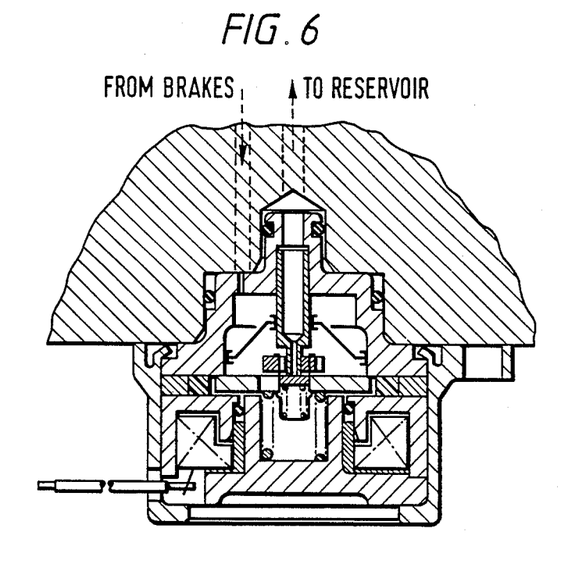

FIGS. 5 and 6 show separate delivery and exhaust valve assemblies arranged for bolting to a surface recess. Each valve is contained within a housing having a flange through which four bolts (one shown) pass to secure the assembly and support the axial pressure load.

Figure 7:
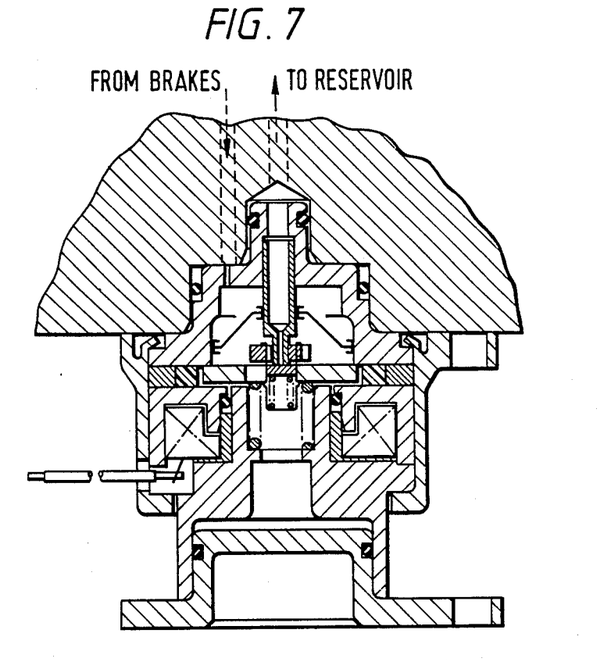
FIGS. 7 and 8 show stackable inlet and exhaust valve assemblies in accordance with the invention.
Figure 8:
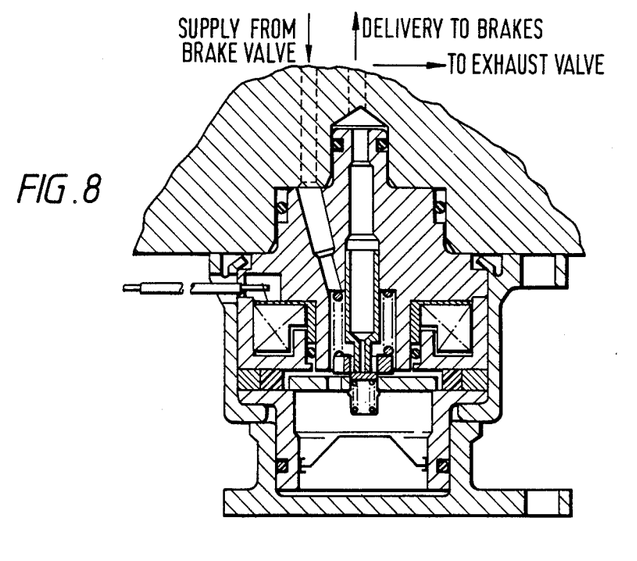
Figure 9:
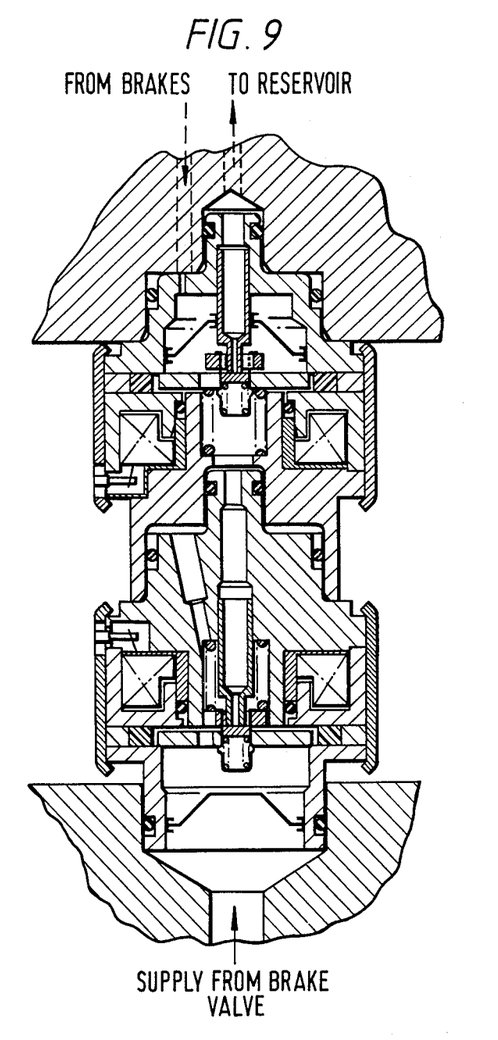
FIG. 9 is a cross-section of a pressure modulator built of the inlet and exhaust valve assemblies shown in FIGS. 7 and 8.

The exhaust valve of FIG. 7 is equivalent to the valve of FIG. 6 except a cover plug is incorporated such that a delivery valve such as shown in FIG. 8 may be stacked with it to form a complete modulator as shown in FIG. 9.

This delivery valve in FIG. 8 is equivalent to the valve of FIG. 5 except that a cover plug is incorporated for stacking. The valve may be stacked as shown in Figure 9 which provides the non-return valve function previously described or it may be inverted as shown in FIG. 10 to omit the non-return valve function.

Figure 10:
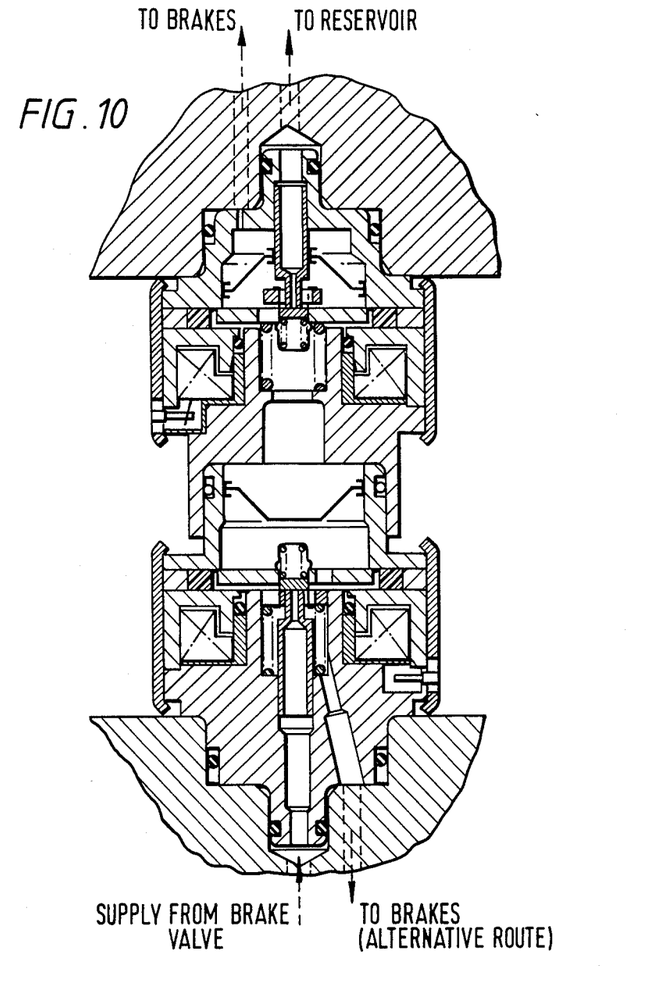
FIG. 10 is a cross-section of another configuration of pressure modulator built of the inlet and exhaust valve assemblies shown in FIGS. 7 and 8.

The assemblies of FIGS. 9 and 10 offer complete modulation like the unit of FIG. 3, but additionally the valve may be used separately and are therefore rationalized designs.

I claim:

1. A solenoid-operated control valve, said control valve comprising a valve element and a valve seat, each having a flat surface, each said flat surface being co-operable to control a flow of fluid through said valve, wherein at least a portion of a solenoid armature has opposed parallel surfaces and is disposed within a gap defined between parallel faces for movement axially within said gap to operate said valve, wherein said flat surface of said valve seat is disposed in a plane of one of said parallel faces, and wherein one of said parallel faces is a face of a solenoid stator, a first spacing means whose thickness determines a magnetic reach of said armature, a second spacing means disposed in said gap to intervene between said armature and said face of said solenoid stator and whose thickness determines an energized gap between said armature and said stator when said solenoid is energized, and a third spacing means whose thickness defines a distance between said valve element face and one of said armature surfaces to produce excess travel of said valve element relative to said armature travel, whereby wear or erosion of one of said valve element and said valve seat is compensated.

2. A valve, according to claim 1, wherein said gap between said parallel faces is defined by a separator ring having the same thickness as said portion of said armature, and said first spacing means whose thickness determines said magnetic reach of said armature.

3. A valve according to claim 1, wherein said valve element is tiltable with respect to said valve seat when being lifted therefrom.

4. A valve, according to claim 1, wherein said valve element is movably mounted to said armature and biasing means are provided to urge said valve element into contact with said valve seat.

5. A valve according to claim 1, wherein said valve element is restrained by being urged into contact with a locating member such that said flat surface of said valve element is kept substantially parallel to said flat surface of said valve seat when not in contact with said valve seat.

6. A valve, according to claim 1, wherein said armature is biased away from said face of said stator so that when said solenoid is inactive, one of said surfaces of said armature abuts said face parallel to said face of said stator.

7. A valve, according to claim 6, wherein said face of said stator faces in an opposite direction to said flat surface of said valve seat, so that said armature and said valve element are urged toward said valve seat whereby said valve is closed when said solenoid is not energized.

8. A valve, according to claim 7, wherein said face of said stator faces in a same direction as said flat surface of said valve seat, so that said armature and said valve element are urged away from said valve seat whereby said valve is open when said solenoid is not energized.

9. A valve, according to claim 8, wherein said valve is a pressure modulator having an inlet valve, a delivery valve and a balanced exhaust valve.

10. A valve, according to claim 7, wherein said valve is a pressure modulator having an inlet valve and a delivery valve.

11. A valve, according to claim 10, wherein each of said valves has a solenoid coil and each valve shares a common solenoid stator.

12. A valve, according to claim 10, wherein said valves are stackable to form said modulator.

13. A valve, according to claim 1, wherein said valve is arranged to invert a fluid flow path therethrough.

14. A valve, according to claim 1, in which said valve is attached to a surface recess by an attachment means.

* * * * *